United States Patent
Huang

(10) Patent No.: US 6,998,205 B2
(45) Date of Patent: Feb. 14, 2006

(54) OPTICAL PROXIMITY CORRECTION METHOD

(75) Inventor: Teng-Yen Huang, Taipei (TW)

(73) Assignee: Nanya Technology Corp., Tao-Yuan Hsien (TW)

( * ) Notice: Subject to any disclaimer, the term of this patent is extended or adjusted under 35 U.S.C. 154(b) by 281 days.

(21) Appl. No.: 10/707,025

(22) Filed: Nov. 16, 2003

(65) Prior Publication Data

US 2005/0106473 A1 May 19, 2005

(51) Int. Cl.
*G01F 9/00* (2006.01)
(52) U.S. Cl. .............................................. 430/5
(58) Field of Classification Search .................. 430/5, 430/394; 716/19–21
See application file for complete search history.

(56) References Cited

U.S. PATENT DOCUMENTS 6,539,521 B1 * 3/2003 Pierrat et al. ................ 716/4
6,598,218 B1 * 7/2003 Lin ............................. 716/21
2004/0219436 A1 * 11/2004 Zhang .......................... 430/5

FOREIGN PATENT DOCUMENTS

| TW | 408367 | 10/2000 |
|----|--------|---------|
| TW | 485271 | 5/2002  |
| TW | 499707 | 8/2002  |

\* cited by examiner

*Primary Examiner*—S. Rosasco
(74) *Attorney, Agent, or Firm*—Winston Hsu

(57) ABSTRACT

An optical proximity correction (OPC) method for modifying a photomask layout. The photomask layout includes a first photomask pattern including a first straight line and a second straight line arranged in parallel with the first straight line. The first and second straight lines have a first line-end and a second line-end respectively. The second line-end is closer to a second photomask pattern than the first line-end. The method includes performing a rule-based OPC to generate a corrected photomask layout, and adding an enhancing feature in the first line-end. The width of the enhancing feature is smaller than that of the first line. The second line-end is still closer to the second photomask pattern than the first line-end with the enhancing feature.

19 Claims, 5 Drawing Sheets

OPTICAL PROXIMITY CORRECTION METHOD

BACKGROUND OF INVENTION

1. Field of the Invention

The invention relates to an optical proximity correction (OPC) method, and more particularly, to an OPC method by sequentially performing a rule-based OPC process and correcting a specific photomask pattern manually.

2. Description of the Prior Art

For transferring a pattern of integrated circuits to a semiconductor substrate, the manufacturer has to produce a photomask with a photomask layout of the circuit design, and then to perform a lithography process to expose the patterns of the photomask layout to a semiconductor substrate in a predetermined ratio. As a result, a lithography process is one of the most important processes in semiconductor fabrication.

The critical dimension (CD) of the designed photomask pattern is limited by the resolution limit of the optical exposure tool, so that an optical proximity effect (OPE) easily occurs when high-density photomask patterns of high circuit integration are exposed to the semiconductor substrate. OPE causes deviations when transferring the photomask patterns. For example, right-angled corner rounding, line end shortening, and line width increasing/decreasing are common defects caused by OPE.

To prevent the defects of the photomask pattern caused by OPE, an OPC process for correcting the photomask layout is usually preformed when fabricating the photomask. The conventional OPC process includes a model-based OPC process or a rule-based OPC process. The rule-based OPC process uses a correction rule of a database to correct the original photomask pattern by taking account of the width and spacing of the original photomask pattern. The model-based OPC process comprises exposing a test photomask to compare the result with the original photomask pattern and using a simulation tool to make complicated calculations. Generally, a large amount of time is required to make the comparison, calculation, and simulation of the test photomask pattern. Therefore the model-based OPC process is not efficient, even though it can obtain a better correction. On the other hand, the rule-based OPC process can compute the target bias to correct the photomask layout faster, but the rule-based OPC may have greater errors resulting from interpolation and unsuitability of functions so that the reliability of the corrected photomask layout is decreased.

Please refer to FIG. 1. FIG. 1 is a schematic diagram of an original photomask layout 10 of the prior art. The photomask layout 10 comprises a first photomask pattern 12 and a second photomask pattern 14. The first photomask pattern comprises a first straight line 12a, a second straight line 12b, a third straight line 12c, and a fourth straight line 12d arranged in parallel with each other, wherein a line-end of the second straight line 12b connects to the second photomask pattern 14. If the original photomask layout 10 is directly used to produce on a photomask for performing a lithography process, a serious OPE will occur so that the exposed pattern in a photoresist layer on a semiconductor substrate will have deviations and defects. Therefore an OPC process has to be performed on the original photomask layout 10.

Referring to FIG. 2, FIG. 2 is a schematic diagram of a corrected photomask layout 16 of the original photomask layout 10 shown in FIG. 1 according to a conventional rule-based OPC process, wherein the dotted lines denote the exposed pattern in a photoresist layer. In the corrected photomask layout 16 according to the rule-based OPC process, an assist feature 18 that can avoid a right-angled corner rounding situation or a split in the straight line resulting from the OPE is added to the line-end closer to the second photomask pattern 14 of the second straight line 12b so that no serious defects occur at the intersection of the second straight line 12b and the second photomask pattern 14. However, in the corrected photomask layout 16 according to the conventional rule-based OPC, as shown in FIG. 2, the defects of line-end shortened still exist in the first, the third, and the fourth straight lines 12a, 12c, and 12d. More seriously, a "bridge problem" occurs at the intersection of the second straight line 12b and the assist feature 18, which means a weak point $P_W$ looking like a bridge or a neck shape appears in the photoresist layer resulting from the light scattering ability or the light reflectivity of materials. This problem often occurs in the second straight line 12b with longer length, and the location of the weak point $P_W$ is horizontal with the line-ends of the first straight line 12a and the third straight line 12c near the second straight line 12b. As shown in FIG. 2, the weak point $P_W$ of the second straight line 12b is very narrow. This will probably cause a defect such as a broken circuit in following production processes. In a more serious situation, an opening of the second straight line 12b may be present at the weak point $P_W$, resulting in that the whole product has to be abandoned.

To conclude the above description, the prior-art rule-based OPC process still cannot correct a photomask layout to obtain an ideal transferred pattern in the photoresist layer effectively. Although the prior-art model-based OPC process can generate a better correction result, it takes a huge amount of time to perform modeling calculations and tests, which cannot match the requirements of a factory of being highly efficient and low cost. As a result, to correct the photomask layout effectively with a simple solution is still one of the important issues in semiconductor manufacturing.

SUMMARY OF INVENTION

It is therefore a primary objective of the claimed invention to provide an OPC method by sequentially performing a rule-based OPC process and adding an enhancing feature in a specific photomask pattern manually to solve the above-mentioned problem.

According to the claimed invention, an OPC method for correcting a photomask layout is provided. The photomask layout comprises at least a first photomask pattern. And the first photomask pattern includes a first straight line and a second straight line arranged in parallel with the first straight line. The first straight line and the second straight line respectively have a first line-end and a second line-end, wherein the second line-end is longer than the first line-end and more protrudent than the first line-end. The OPC method of the claimed invention comprises performing a rule-based OPC method to the original photomask layout to generate a corrected photomask layout, and then adding an enhancing feature in the first line-end of the first straight line, wherein the width of the enhancing feature has to be smaller than the width of the first straight line, and the second line-end is still more protrudent than the first line-end of the first straight line after the enhancing feature is added.

It is an advantage of the claimed invention that a rule-based OPC process costing less time is first performed to obtain a rudimentary corrected photomask layout and then the enhancing features are manually added in the patterns near the weak point $P_W$ of the rudimentary corrected photomask layout so that the bridge problem can be prevented. The claimed invention method increases the contrast of photolithography process and the process window, and therefore the patterns of the photomask layout can be transferred to the photoresist layer much realistically without any other new fabrication process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
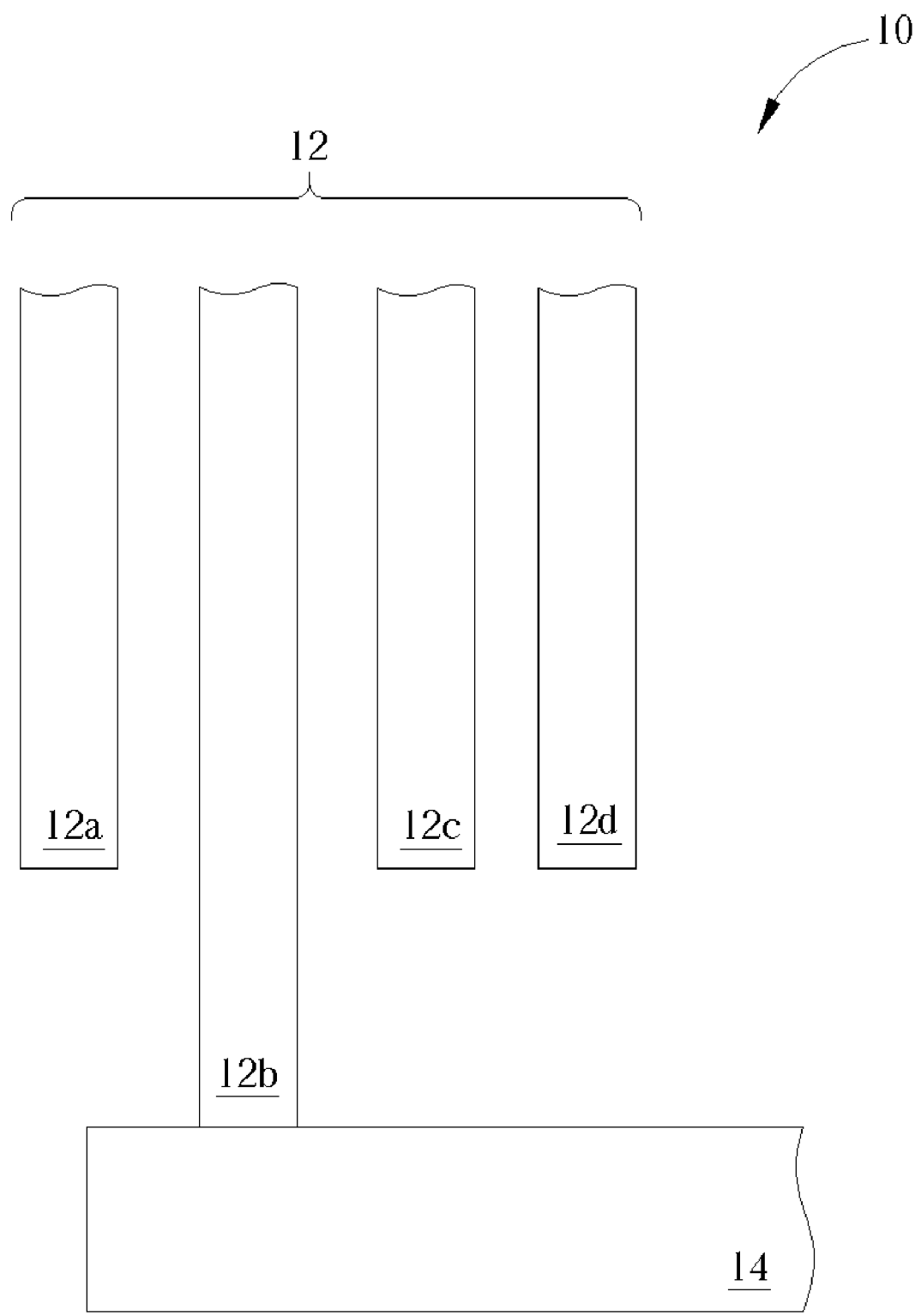
FIG. 1 is a schematic diagram of an original photomask layout of the prior art.
Figure 2:
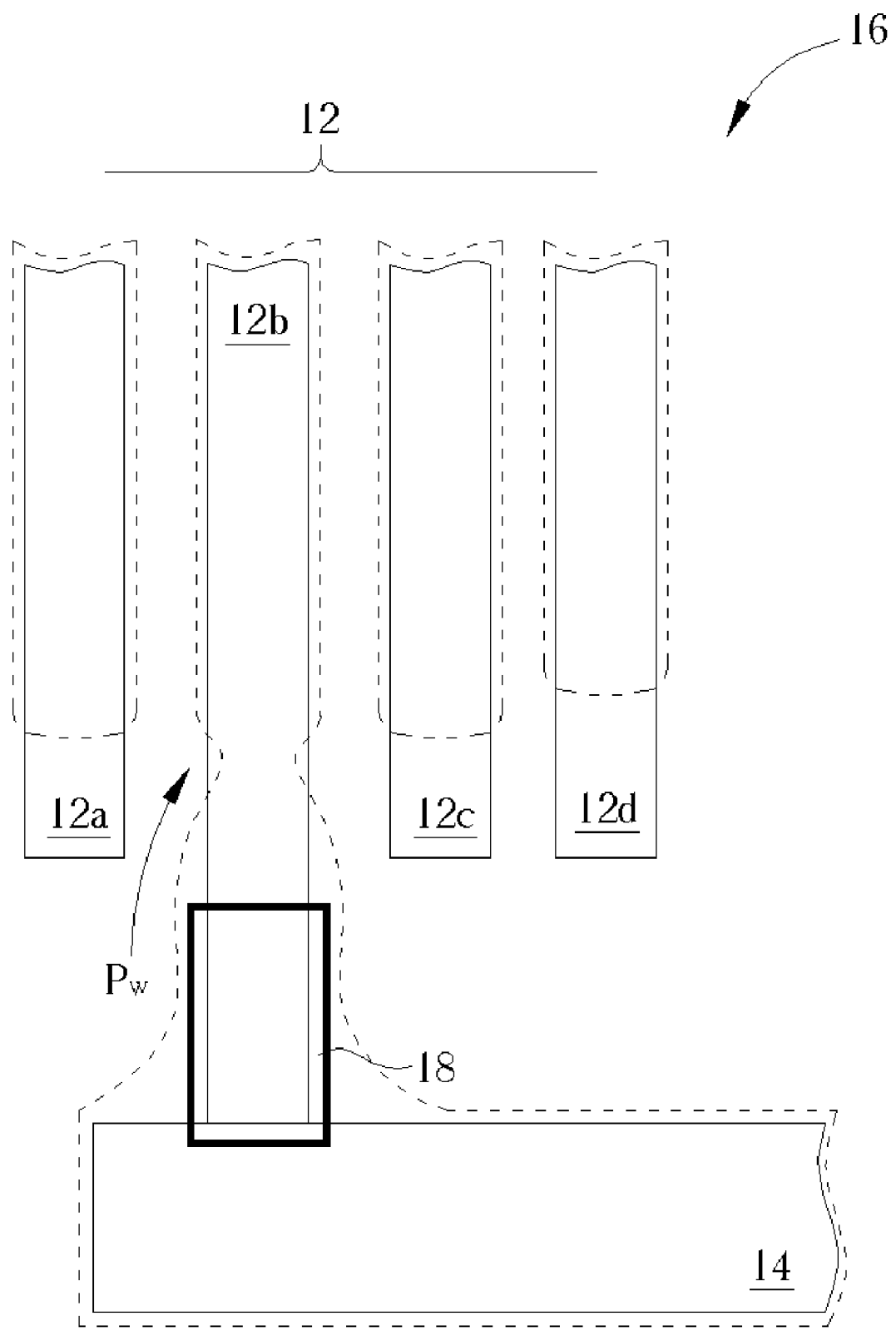
FIG. 2 is a schematic diagram of a corrected photomask layout of the original photomask layout shown in FIG. 1 according to the prior-art rule-based OPC process.
Figure 3:
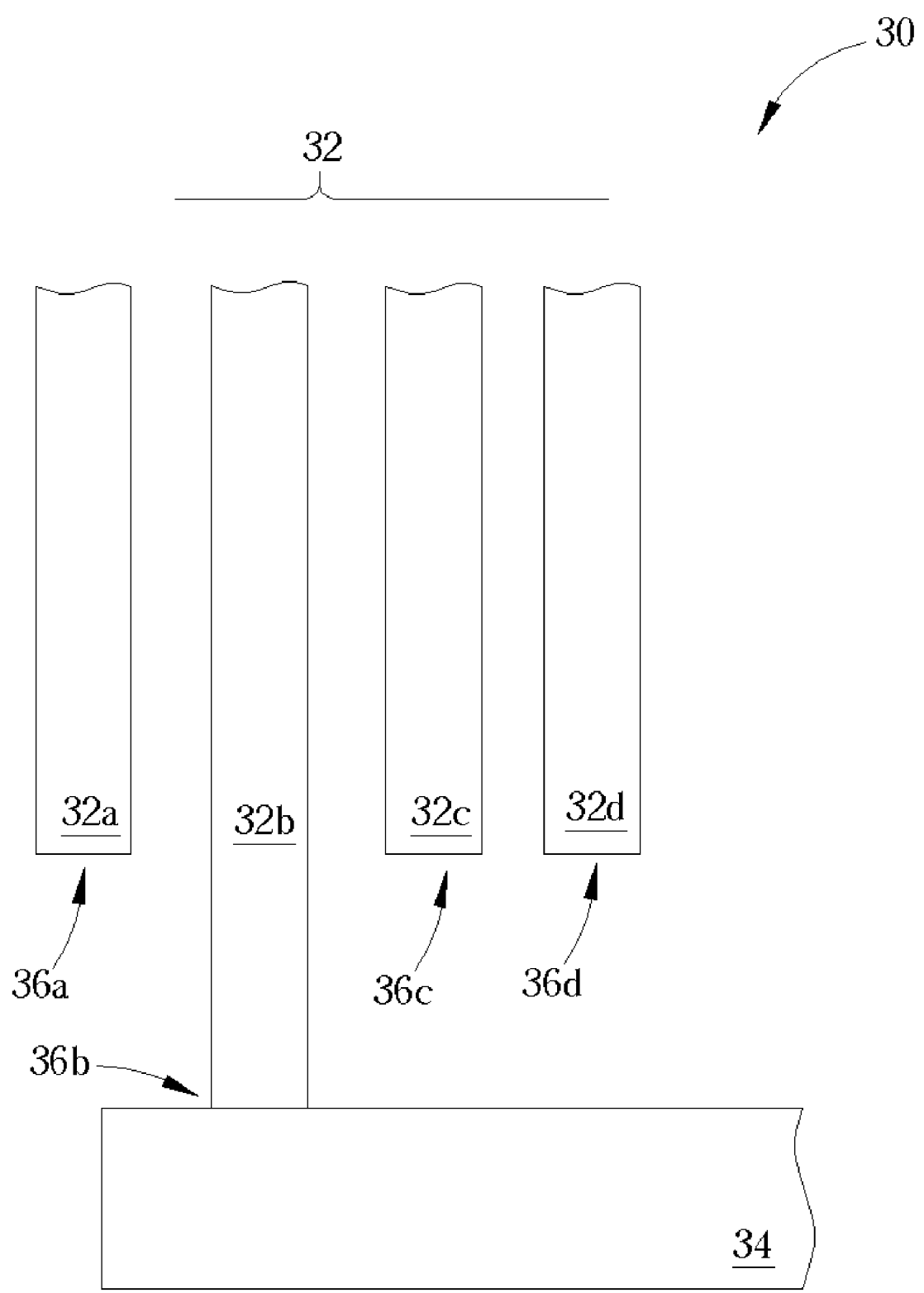
FIG. 3 is a schematic diagram of an original photomask layout of the present invention.

Please refer to FIG. 3. FIG. 3 is a schematic diagram of an original photomask layout 30 of the present invention. The photomask layout 30 comprises a first photomask pattern 32 and a second photomask pattern 34. The first photomask pattern includes a first straight line 32a, a second straight line 32b, a third straight line 32c, and a fourth straight line 32d respectively having a first line-end 36a, a second line-end 36b, a third line-end 36c, and a fourth line-end 36d closer to the second photomask pattern 34. The second line-end 36b of the second straight line 32b reaches to the second photomask pattern 34. The four straight lines are arranged in parallel with each other and in a first direction. The second photomask pattern 34 is also a straight line arranged in a second direction and perpendicular to the second straight line 32b. In the photomask layout 30, the second photomask pattern 34 and the second straight line 32b are the main patterns of the photomask layout 30, which means the second photomask pattern 34 and the second straight line 32b are originally designed circuit patterns, while the first straight line 32a, the third straight line 32c, and the fourth straight line 32d are dummy patterns for adjusting the spacings of the main patterns of the photomask layout 30 to improve the exposing effect. According to a preferable embodiment of the present invention, the line widths of all the straight lines of the second photomask pattern 14 are 110 nanometers (nm), and the line spacings between all the straight lines of the second photomask pattern 14 are also 110 nm.

Figure 4:
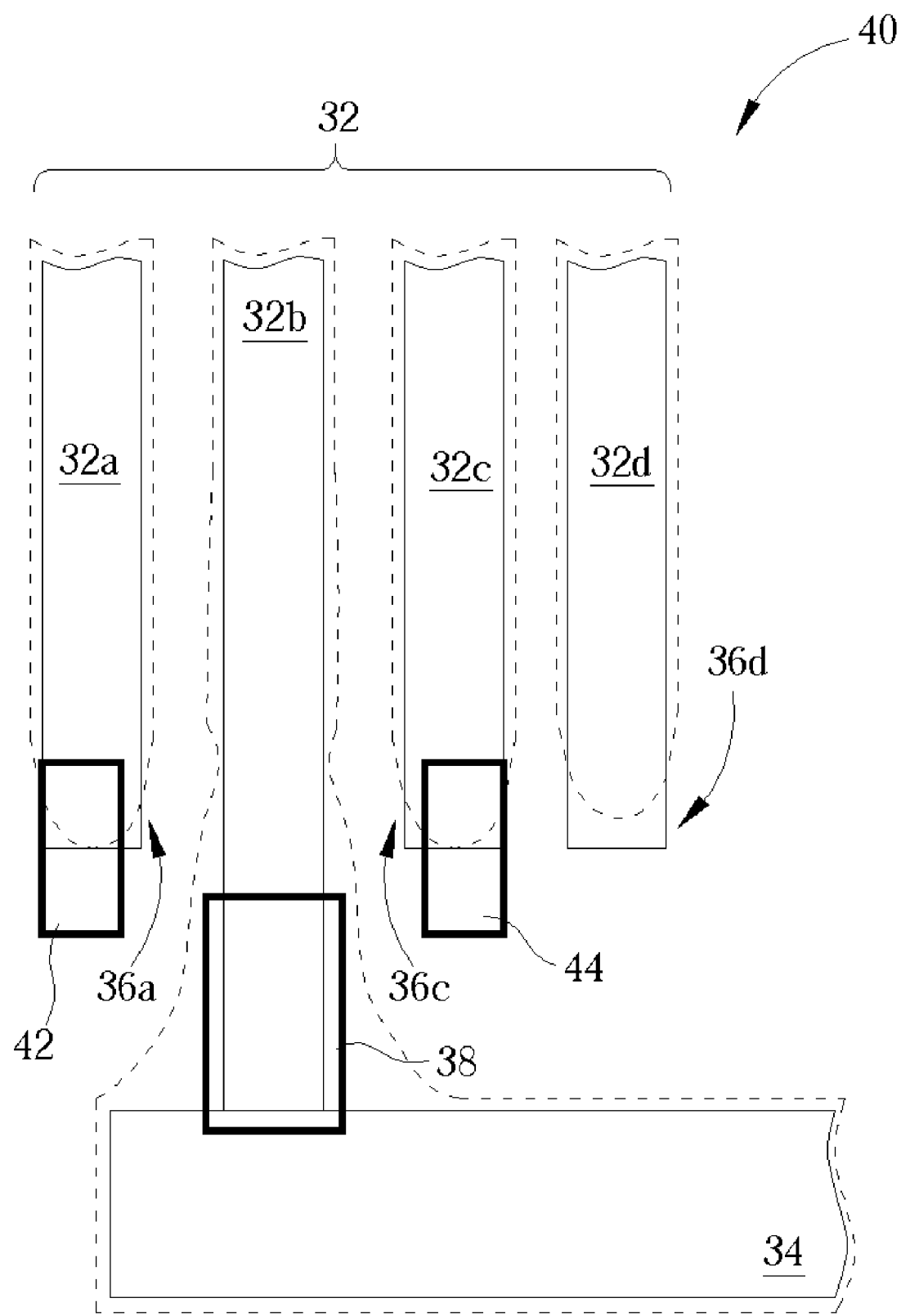
FIG. 4 is a schematic diagram of a corrected photomask layout of the original photomask layout shown in FIG. 3 according to the present invention OPC method.

Please refer to FIG. 4. FIG. 4 is a schematic diagram of a corrected photomask layout 40 of the original photomask layout 30 shown in FIG. 3 according to the present invention OPC method, wherein the dotted lines denote the exposing result. At first, a rule-based OPC process is performed to the original photomask layout 30. The density, line width, line length, and spacing of each of the photomask patterns are collected to compute a target bias by using a correction rule of a database. After that, the target bias is added to the original photomask layout 30. In FIG. 4, the assist feature 38 is added according to the target bias from the rule-based OPC process. It should be noticed that the assist features obtained from the rule-based OPC process might be serif or hammerhead patterns, not limited by the rectangular pattern of the assist feature 38 in FIG. 4. After generating the corrected photomask layout 40, enhancing features 42 and 44 as rectangular patterns are respectively added in the first line-end 36a and the third line-end 36c adjacent to the second straight line 32b. As shown in FIG. 4, the width of the enhancing feature 42 is slightly smaller than the line width of the first straight line 32a, and the width of the enhancing feature 44 is also slightly smaller than the line width of the third straight line 32c. In this embodiment, since the width of the first straight line 32a and the third straight line 32c is 110 nm, the width of the enhancing features 42 and 44 is selected to be between 80 nm to 90 nm. Generally, the lengths of the rectangular enhancing features 42 and 44 are not limited. However, each of the lengths of the enhancing features 42 and 44 is preferably chosen to shorten the distance between the first, the third line-ends 36a, 36c and the second photomask pattern 34 to become ½ to ⅔ of the original distance.

The characteristic of the present invention is to add enhancing features in the photomask patterns adjacent to the photomask patterns that may have bridge problems, instead of directly adding assist features in the weak point $P_W$ or the point having the bridge problem. As the exposing result shows in FIG. 4, after the enhancing features 42 and 44 are added, the bridge problem is obviously improved. The weak point $P_W$ of the second straight line 32b disappears, and therefore the doubt of the straight line splitting does not exist. In addition, the line-ends of the first and the third straight lines 32a and 32c with the enhancing features 42 and 44 have better exposed patterns. As shown in FIG. 4, the exposed patterns of the first and the third line-ends 36a and 36c of the corrected photomask layout 40 are more identical to the first line-end 36a and the third line-end 36c of the original photomask layout 30. As a result, in another embodiment, the present invention can supply a definitely better exposed photomask layout with the first straight line 32a, the third straight line 32c, and the fourth straight line 32d being main patterns of an original photomask layout than the prior art.

Figure 5:
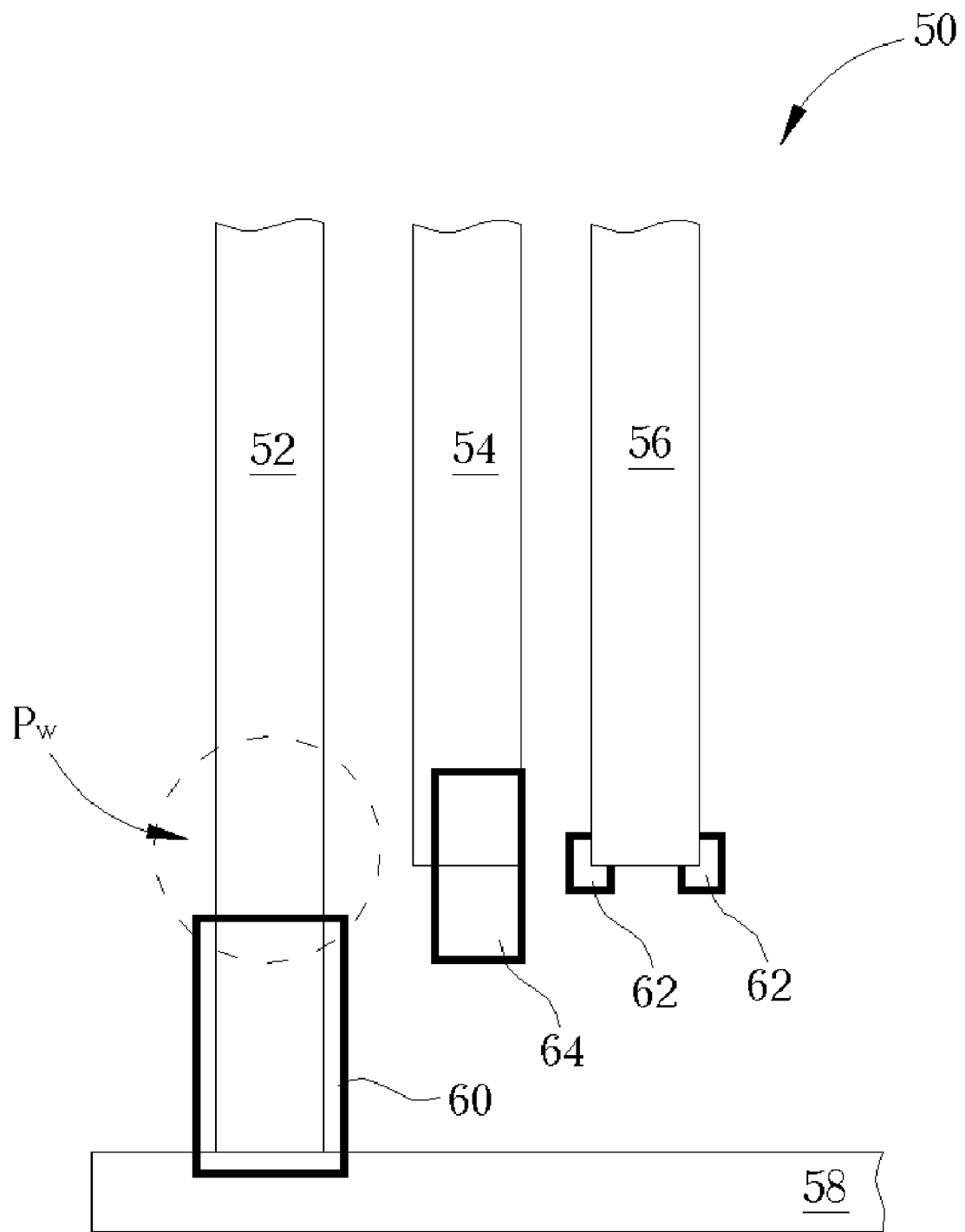
FIG. 5 is a schematic diagram of a corrected photomask layout of a second embodiment of the present invention OPC method.

In addition, the present invention OPC method can be applied to other similar photomask layouts. Please refer to FIG. 5. FIG. 5 is a schematic diagram of a corrected photomask layout 50 of a second embodiment according to the present invention OPC method. The photomask layout 50 comprises the photomask patterns of a first straight line 52, a second straight line 54, a third straight line 56, and a fourth straight line 58, wherein the first straight line 52 reaches to the fourth straight line 58. When the original photomask layout 50 is exposed to the semiconductor substrate, a weak point $P_W$ will exist in the first straight line 52 (at the point the arrowhead points). According to the present invention, a rule-based OPC process is first performed to add an assist feature 60 in the line-end of the first straight line 52 and add serif patterns 62 in the line-end of the third straight line 56. Then an enhancing feature 64 is added in the line-end of the second straight line 54 according to the principle mentioned above of the present invention so that the weak point $P_W$ can be prevented to generate a better exposing result. In another embodiment of the present embodiment, the photomask layout comprises a plurality of straight lines arranged in parallel with each other, wherein one of the straight lines has a line-end more protrudent than adjacent straight lines. According to the present invention, after the rule-based OPC process is performed, an enhancing feature is added in the line-end of each of the two straight lines adjacent to the protrudent line-end to complete the correction of the photomask layout.

In contrast to the prior art, the present invention can effectively overcome the disadvantages of the prior-art OPC method by using simple processes to correct the photomask layout so as to generate a best corrected photomask layout without changing any production processes on the semiconductor substrate. In the present invention, only a new correction step is needed to add the enhancing features with smaller width in the photomask patterns manually to effectively improve the bridge problem, and furthermore to prevent the product from having broken circuit or conducting defects. On the other hand, the present invention also can raise the contrast of the photolithography process and process window to generate an exposed layout in the photoresist layer more identical to the original photomask pattern, and even more can transfer amore exquisite photomask layout to the photoresist layer.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical proximity correction (OPC) method for correcting a photomask layout, the photomask layout comprising at least a first photomask pattern including a first straight line having a first line-end arranged in a first direction and a second straight line arranged in parallel with the first straight line, the second straight line having a second line-end being longer and more protrudent than the first line-end, the OPC method comprising:
    performing a rule-based OPC process to generate a corrected photomask layout; and
    adding an enhancing feature in the first line-end, a width of the enhancing feature being smaller than a width of the first straight line, and the second line-end being still more protrudent than the first line-end with the enhancing feature.

2. The OPC method of claim 1, wherein the photomask layout further comprises a second photomask pattern, the second line-end being closer to the second photomask pattern than the first line-end.

3. The OPC method of claim 2, wherein the second line-end reaches to the first photomask pattern.

4. The OPC method of claim 2, wherein a distance is present between the first line-end and the second photomask pattern, and adding the enhancing feature is performed by shortening the distance to ½ to ⅔ times of the distance.

5. The OPC method of claim 2, wherein the second photomask pattern is a straight line.

6. The OPC method of claim 5, wherein the second photomask pattern is arranged in a second direction.

7. The OPC method of claim 6, wherein the first direction is perpendicular to the second direction.

8. The OPC method of claim 1, wherein the enhancing feature is a rectangle pattern.

9. The OPC method of claim 1, wherein the rule-based OPC process comprises:
    collecting a width, a length, and a spacing of each of the photomask patterns of the photomask layout to obtain a group of parameters of the photomask layout;
    computing a target bias of the photomask layout by using a correction rule of a database according to the group of parameters; and
    adding an assist feature in the photomask layout according to the target bias.

10. The OPC method of claim 9, wherein the assist feature is a serif or a hammerhead pattern.

11. An OPC method for correcting a photomask layout, the photomask layout comprising:
    a first photomask pattern including a first straight line, a second straight line, and a third straight line arranged in parallel with each other and in a first direction; and
    a second photomask pattern;
    wherein the first, the second, and the third straight lines respectively have a first line-end, a second line-end, and a third line-end closer to the second photomask pattern, wherein the second line-end is more protrudent than the first line-end and the third line-end and reaches to the second photomask pattern, a first distance is present between the first line-end and the second photomask pattern, and a second distance is present between the third line-end and the second photomask pattern, the OPC method comprising:
    performing a rule-based OPC process to generate a corrected photomask layout; and
    adding a first enhancing feature and a second enhancing feature in the first line-end and the third line-end of the corrected photomask layout respectively, a width of the first enhancing feature and a width of the second enhancing feature being smaller than a width of each of the first straight line and a width the third straight line respectively, and both the first distance and the second distance being shortened.

12. The OPC method of claim 11, wherein adding the first enhancing feature is performed by shortening the first distance to ½ to ⅔ times of the first distance.

13. The OPC method of claim 11, wherein adding the second enhancing feature is performed by shortening the second distance to ½ to ⅔ times of the second distance.

14. The OPC method of claim 11, wherein the first and the second enhancing feature are rectangle patterns.

15. The OPC method of claim 11, wherein the second photomask pattern is a straight line.

16. The OPC method of claim 15, wherein the second photomask pattern is arranged in a second direction.

17. The OPC method of claim 16, wherein the first direction is perpendicular to the second direction.

18. The OPC method of claim 11, wherein the rule-based OPC process comprises:
    collecting a width, a length, and a spacing of each of the photomask patterns of the photomask layout to obtain a group of parameters of the photomask layout;
    computing a target bias of the photomask layout by using a correction rule of a database according to the group of parameters; and
    adding an assist feature in the photomask layout according to the target bias.

19. The OPC method of claim 18, wherein the assist feature is a serif or a hammerhead pattern.

* * * * *